March 13, 1928.
S. G. NOTTAGE
1,662,508
ALTERNATING CURRENT MOTOR
Filed March 13, 1924
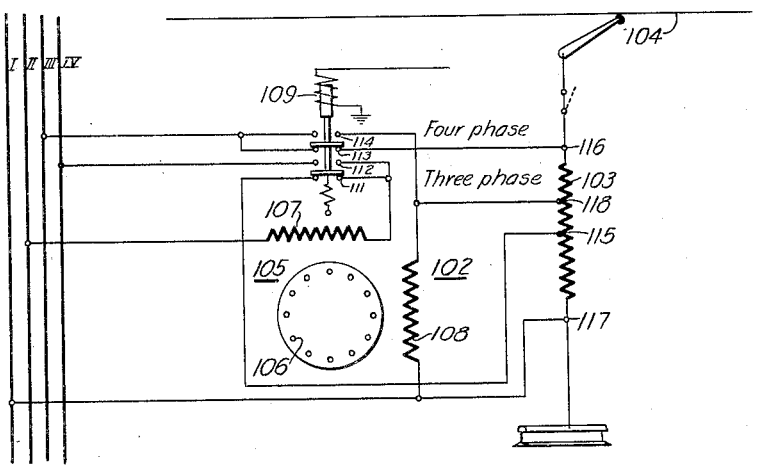
WITNESSES:
INVENTOR
Stanley G. Nottage
BY
ATTORNEY Patented Mar. 13, 1928.

1,662,508

UNITED STATES PATENT OFFICE.

STANLEY G. NOTTAGE, OF MURRAYSVILLE, PENNSYLVANIA, ASSIGNOR TO WESTINGHOUSE ELECTRIC & MANUFACTURING COMPANY, A CORPORATION OF PENNSYLVANIA.

ALTERNATING-CURRENT MOTOR.

Application filed March 13, 1924. Serial No. 698,881.

My invention relates to alternating-current machines and it has special relation to phase-converting apparatus.

The principal object of my invention is to provide an improved phase-modifying system wherein the minimum numbers of circuits and connections are utilized and wherein single-phase power is converted into either three-phase or four-phase power, the phase number being determined by the simple manipulation of a single double-pole switch.

The principles of my invention together with certain embodiments and applications thereof will be better understood from the following description taken in connection with the accompanying drawings wherein the single figure is a diagrammatic view of circuits and apparatus illustrating the connections and circuits in a locomotive drive system embodying my invention.

Energy is supplied from a translating device 102, comprising an auto transformer 103 deriving single-phase power from a trolley wire 104 and a phase balancer 105 having a closed-circuited rotor member 106 and two quarter-phase stator windings 107 and 108 for converting the single-phase supply currents received from the auto transformer 103 into balanced three or four-phase currents for the operation of the motor (not shown).

The translating device 102 may be connected to supply either three or four-phase currents by means of an electro-magnetic switch 109 which, when it is de-energized and occupies its lower position, provides the three-phase connections, and when it is energized and occupies its upper position, provides the four-phase connections. The switch 109 is provided with four pairs of contact members 111, 112, 113 and 114.

In the lower switch position the contact members 111 and 113 are closed-circuited, connecting the phase-balancer winding 107 between the supply-line conductor II and a middle terminal 115 of the auto-transformer 103 and connecting the supply-line conductor III to one end terminal 116 of the auto transformer 103. The other end terminal 117 of the auto transformer 103 is permanently connected to the supply line conductor I. The second-phase balancer winding 108 is permanently connected between the end terminal 117 and an auxiliary terminal 118 of the auto transformer 103, the voltage between the two terminals 117 and 118 corresponding to $\frac{1}{2} \sqrt{3}$ times the full voltage of the auto transformer 103. With the foregoing connection, the translating device 102 supplies the three supply-line conductors I, II and III with balanced three phase currents.

When the electro-magnetic switch 109 is energized and in its upper position, the contact members 112 and 114 are closed-circuited, connecting the stator winding 107 across the supply-line conductors II and IV, and connecting the stator winding 108 across the supply-line conductors I and III, the latter winding being also connected between the end terminal 117 and the auxiliary terminal 118 of the auto-transformer 103. With this connection the supply-line conductors I, II, III and IV are supplied with balanced four-phase currents. While the translating device 102 is particularly well adapted for supplying energy to motor-aggregates utilizing variable pole-number windings operating on three-phase and four-phase currents, respectively, its usefulness is by no means restricted to such applications only.

I claim as my invention:

1. The combination with a source of single phase currents, of a phase balancer comprising two windings disposed in two different phases, means for supplying one of said windings from said source, and means for connecting the other of said windings to constitute, in combination with said source, a source of currents of either one of a plurality of phase numbers.

2. The combination with an energizing winding supplying single phase currents, of a phase-balancer comprising two quarter-phase windings, means for supplying one of said phase-balancer windings from said energizing winding, the voltage across said phase-balancer windings being approximately $\frac{1}{2} \sqrt{3}$ of the voltage of said energizing winding, means for connecting, at times, the other of said phase-balancer windings in T-relation to a mid-point of said energizing winding to provide a source of balanced three-phase currents and means for connecting at other times said last-mentioned phase-balancer windings and a portion of said energizing winding to provide a source of balanced quarter-phase currents.

In testimony whereof, I have hereunto subscribed my name this 5th day of March 1924.

STANLEY G. NOTTAGE.